United States Patent
Sherrer et al.

(10) Patent No.: US 6,738,145 B2
(45) Date of Patent: May 18, 2004

(54) MICROMACHINED, ETALON-BASED OPTICAL FIBER PRESSURE SENSOR

(75) Inventors: David W Sherrer, Blacksburg, VA (US); Don E Leber, Shawsville, VA (US); Dan A Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 77 days.

(21) Appl. No.: 09/814,526

(22) Filed: Mar. 22, 2001

(65) Prior Publication Data

US 2002/0003917 A1 Jan. 10, 2002

Related U.S. Application Data

(60) Provisional application No. 60/197,129, filed on Apr. 14, 2000.

(51) Int. Cl.[7] .................................................. G01B 9/02
(52) U.S. Cl. ..................... 356/480; 250/227.17; 385/12
(58) Field of Search ................................ 356/480, 519, 356/35.5; 250/227.17, 227.19; 385/12

(56) References Cited

U.S. PATENT DOCUMENTS

| | | |
|---|---|---|
| 3,853,650 A | 12/1974 | Hartlaub |
| 3,893,228 A | 7/1975 | George et al. |
| 4,203,128 A | 5/1980 | Guckel et al. |
| 4,234,361 A | 11/1980 | Guckel et al. |
| 4,446,543 A | 5/1984 | McLandrich et al. ....... 367/149 |
| 4,597,003 A | 6/1986 | Aine et al. |
| 4,682,500 A | 7/1987 | Uda ............................... 73/705 |
| 4,825,262 A | 4/1989 | Mallinson .................... 356/352 |
| 4,926,696 A | 5/1990 | Haritonidis et al. ........... 73/205 |
| 4,933,545 A | 6/1990 | Saaski et al. .......... 250/227.14 |
| 4,942,767 A | 7/1990 | Haritonidis et al. ........... 73/705 |
| 5,022,745 A | 6/1991 | Zayhowski et al. |
| 5,247,490 A | 9/1993 | Goepel et al. ............... 367/149 |
| 5,381,231 A | 1/1995 | Tu ............................... 356/352 |
| 5,600,070 A | 2/1997 | Wlodarczyk .................. 73/715 |
| 5,619,046 A | 4/1997 | Engstrom et al. ............. 257/82 |
| 5,654,819 A | 8/1997 | Goossen et al. |
| 5,920,391 A | 7/1999 | Grasdepot et al. |
| 5,943,155 A | 8/1999 | Goossen |
| 6,218,661 B1 * | 4/2001 | Schroeder et al. ..... 250/227.14 |
| 6,281,976 B1 * | 8/2001 | Taylor et al. ................ 356/480 |

* cited by examiner

Primary Examiner—Edward J. Glick
Assistant Examiner—Irakli Kiknadze
(74) Attorney, Agent, or Firm—Niels Haun; Jonathan D. Baskin

(57) ABSTRACT

An optical fiber pressure sensor having a base layer 20 with an optical fiber hole, a fiber stop layer 28 and, optionally, an etch stop layer 24. The fiber stop layer optionally has a fiber stop hole 33 that is smaller than the optical fiber 22. A diaphragm cap layer 32 is bonded to the fiber stop layer 28. The diaphragm cap layer 32 has a diaphragm 34 spaced apart from the optical fiber. The optical fiber and diaphragm form an Etalon that changes cavity length with applied pressure. Optionally, the device is made almost entirely of silicon, and so has reduced mechanical stress problems caused by thermal expansion mismatches. This allows the present sensor to be used in high temperature environments such as internal combustion engines.

49 Claims, 8 Drawing Sheets

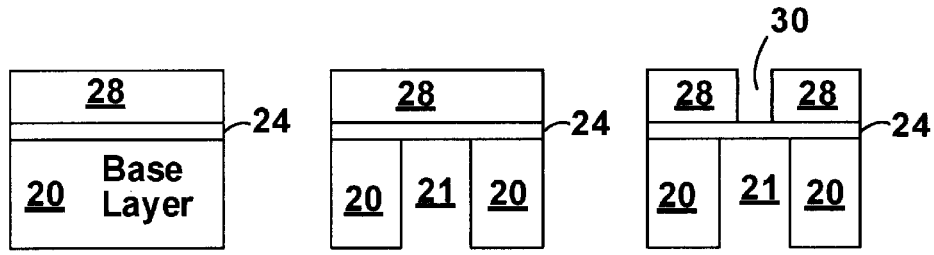
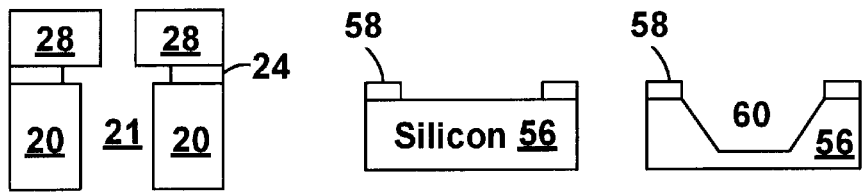
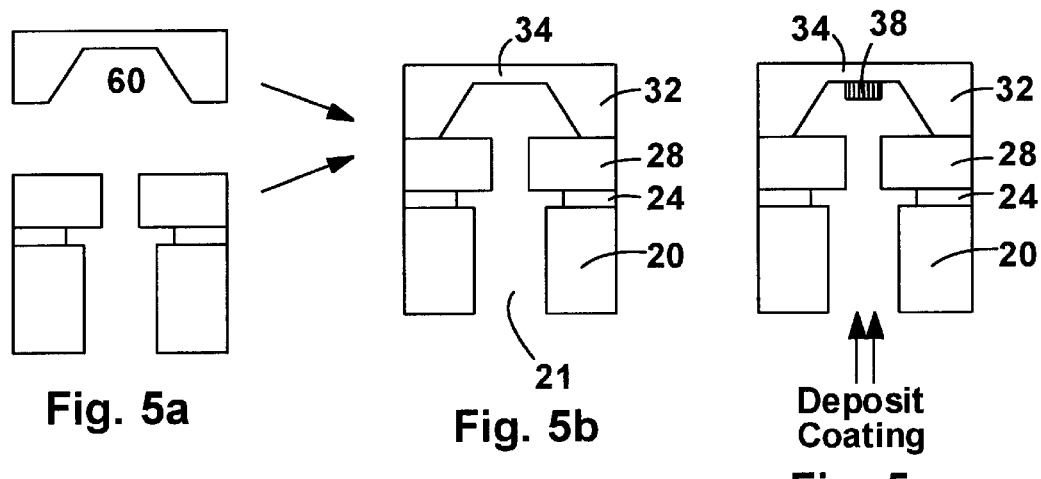
Fig. 3a  Fig. 3b  Fig. 3c
Fig. 3d  Fig. 4a  Fig. 4b
Fig. 5a  Fig. 5b  Fig. 5c
Fig. 5d

MICROMACHINED, ETALON-BASED OPTICAL FIBER PRESSURE SENSOR

RELATED APPLICATIONS

The present application claims the benefit of priority of copending provisional patent application No. 60/197,129 filed on Apr. 14, 2000, which is hereby incorporated by reference.

FIELD OF THE INVENTION

The present invention relates generally to optical fiber sensors. More particularly, the present invention relates to a micromachined optical fiber pressure sensor.

BACKGROUND OF THE INVENTION

Optical fiber sensors are used to measure temperature, pressure, displacement and the like. Optical fiber sensors have several advantages over electronic sensors. Significantly, optical fiber sensors are not affected by electromagnetic noise. Also, optical fiber sensors can have higher temperature capability than electronic sensors.

Presently there is a demand for an optical fiber pressure sensor capable of measuring pressure in the combustion chamber of an internal combustion engine. Electronic sensors do not function well in an internal combustion engine because of high temperatures and electromagnetic noise created by the engine. An optical fiber pressure sensor capable of operation in an internal combustion engine would allow for dynamic fuel efficiency control and other benefits.

The prior art describes optical fiber pressure sensors having a Fabry-Perot cavity at the end of an optical fiber. Variation in applied pressure alters the Etalon cavity length and hence the optical response of the Etalon cavity. A sensor system coupled to the optical fiber measures applied pressure by monitoring the optical characteristics of the Etalon.

Some of the prior art pressure sensors have disadvantages, including:

1) a nonlinear response to temperature changes. This is a problem where the pressure sensor must operate linearly over a wide range of temperatures (e.g. in an internal combustion engine);
2) absence of a mechanism for providing an accurate fiber-diaphragm spacing (i.e. etalon cavity length). This is particularly important in devices where the fiber endface functions as a reflector in an etalon. In such devices the optical fiber must be accurately longitudinally located with respect to the diaphragm; and
3) too many parts. Several of the prior art devices require precise alignment of small parts, which is expensive and difficult.

It would be an advance in the art of optical pressure sensors to provide a pressure sensor that is simple to assemble with an accurate etalon cavity length, requires a small number of parts and can tolerate high heat.

SUMMARY

The present invention is directed to an optical fiber pressure sensor. The apparatus provides a linear pressure response, is simple in construction and passively provides an accurate etalon cavity length.

The present apparatus comprises a base layer with an optical fiber hole for receiving an optical fiber. A fiber stop layer is disposed on the base layer over the optical fiber hole. A diaphragm cap layer is disposed over the fiber stop layer.

The diaphragm cap layer has a diaphragm aligned with the optical fiber hole in one embodiment of the invention.

In use, an optical fiber is typically disposed in the optical fiber hole in order for the device to operate as intended.

The optical fiber is butted against the fiber stop layer in one embodiment of the invention. The fiber stop layer may or may not have a hole aligned with the optical fiber hole. Butting the optical fiber against the fiber stop layer provides an accurate etalon cavity length.

The apparatus may include an etch stop layer disposed between the fiber stop layer and base layer. The fiber can be butted against this as well. The etch stop layer may or may not have a hole aligned with the optical fiber hole.

In an aspect of the invention, the etch stop layer has a thickness in the range of about 0.04 to 2 microns. Optionally, the etch stop layer has a thickness less than 1/250 the thickness of the base layer, or less than 1/50 the thickness of the fiber stop layer. The base layer can have a thickness in the range of about 125–1000 microns; the fiber stop layer can have a thickness in the range of about 10–100 microns.

The etalon cavity length can be in the range of 20–200 microns.

The diaphragm can be spaced apart from the fiber stop layer, or bonded directly to the fiber stop layer. The diaphragm cap layer can have an etched pit, or the diaphragm cap layer can be a flat layer.

Optionally, the base layer and diaphragm cap layer are made of the same material. This tends to reduce possible problems associated with thermal expansion mismatches. The fiber stop layer can be made of a material different from the base layer and diaphragm cap layer.

Optionally, the base layer, fiber stop layer and diaphragm layer are made of single crystal silicon. Also optionally, the etch stop layer is made of SiO2, glass, alumina or silicon nitride.

DESCRIPTION OF THE FIGURES

FIGS. 3a–3d illustrate a method for making the base layer, optical fiber hole, and fiber stop layer for one embodiment.

FIGS. 4a–4b illustrate a method for making the diaphragm cap layer for one embodiment of the invention.

FIGS. 5a–5d illustrate how the diaphragm cap layer and fiber stop layer are stacked together and subsequently processed for one embodiment.

DETAILED DESCRIPTION OF THE INVENTION

The present invention provides an optical fiber pressure sensor comprising micromachined silicon. The sensor has a micromachined hole for receiving an optical fiber, and a flexible diaphragm opposite the hole. A fiber stop layer is provided at the bottom of the hole. An optical fiber is inserted in the hole and butted against the fiber stop layer, thereby defining an etalon cavity between the diaphragm and the optical fiber endface. The etalon cavity length is determined by the distance between the fiber stop layer and the diaphragm. In one embodiment, the pressure sensor is comprised almost entirely of single crystal silicon. This provides the sensor with high heat resistance and linear temperature response. The pressure sensor is made by bonding two silicon chips (one having the diaphragm, and one having the hole and fiber stop layer). The present sensor can be made in large batches by bonding two micromachined silicon wafers, and then dicing the bonded wafers into individual pressure sensor chips.

Figure 1:
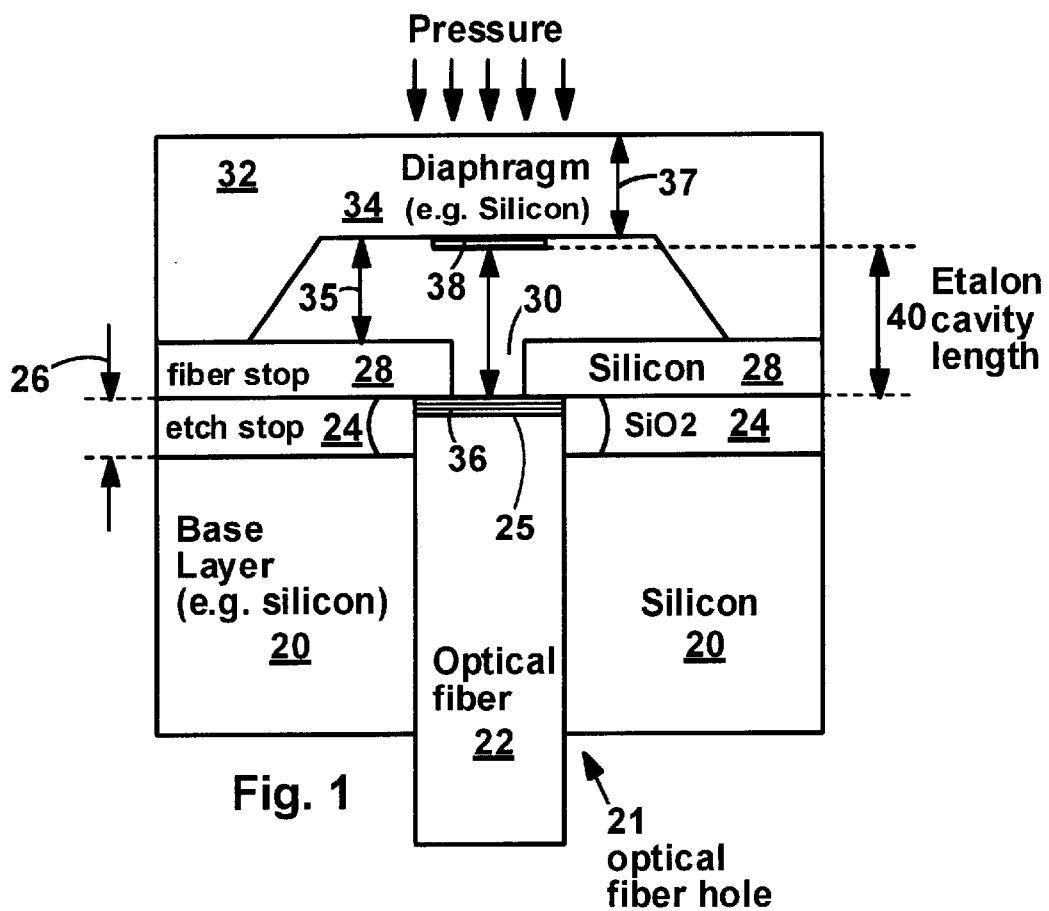
FIG. 1 shows a side view of a pressure sensor according to one embodiment of the present invention.

FIG. 1 shows a side view of a preferred embodiment of the present invention. The optical fiber pressure sensor comprises a base layer 20 having an optical fiber hole 21 holding an optical fiber 22. Preferably, the hole 21 is slightly wider (e.g. 1–10 microns wider) than the optical fiber 22 so that the optical fiber 22 cannot move significantly within the hole 21. The hole depth is preferably at least 3–5 times the fiber diameter (e.g. about 125–625 microns for a 125 micron diameter fiber). An etch-stop layer 24 is over the base layer 20. Optionally, the etch stop layer 24 thickness 26 is very thin compared to the base layer (e.g. less than 1/100 the thickness of the base layer). For example, the etch stop layer thickness can be in the range of about 0.05–1 micron.

A fiber stop layer 28 is over the etch stop layer 24. The fiber stop layer 28 has a fiber stop hole 30 that is smaller than an optical fiber endface 25 so that the optical fiber 22 cannot pass through the fiber stop hole 30. The optical fiber 22 is positioned by butting the endface 25 against the fiber stop layer 28. The fiber stop hole 30 must be aligned with the optical fiber hole 21 so that light from the optical fiber 22 passes through the fiber stop hole 30. The hole 30 should be larger than the optical fiber mode (not shown); for example, the hole 30 can be about 40–100 microns in diameter. The fiber stop layer 28 can be about 5–40 microns thick. The fiber stop layer 28 should be thick enough so that it is strong enough to function as a fiber stop.

A diaphragm cap 32 is bonded to the fiber stop layer 28. The diaphragm cap has a diaphragm 34 that is responsive to external pressure changes. Optionally, an enclosed volume is trapped between the diaphragm 34 and fiber stop layer 28. The diaphragm cap 34 has a well defined etch depth 35. Also, the diaphragm 34 has a well-defined thickness 37. The thickness 37 is an important parameter that influences the sensitivity of the pressure sensor.

In one embodiment of the invention, the base layer 20, fiber stop layer 28, and diaphragm cap layer 32 are made of single crystal silicon and the etch stop layer 24 is made of SiO2 (CVD or thermal), silicon nitride, borosilicate glass, alumina, metals or ceramics. Optionally, the diaphragm cap layer 32, base layer 20, and fiber stop layer 28 are made of ceramics (silicon nitride, alumina), SiO2, metals, carbides, or nitrides.

Optionally, the fiber endface 25 and diaphragm 34 have optical coatings 36 and 38 to provide controlled reflectivity. Optionally, the reflectivity of the diaphragm 34 is close to 100% and the reflectivity of the fiber endface 25 is about 50%.

The fiber endface 25 and diaphragm 34 define an etalon cavity length 40. The etalon cavity length 40 decreases with increased external pressure on the diaphragm 34, and the etalon cavity length 40 increases with decreased pressure on the diaphragm 34.

In operation, light from the optical fiber 22 reflects from both the optical fiber endface coating 36 and the diaphragm 38, producing well-known Etalon-type optical interference. The Etalon optical response is altered by applied external pressure.

The etalon cavity length 40 is determined by the combined thickness of the fiber stop layer 28 and etch depth 35. In the present invention, the fiber stop layer 28 should have an accurate thickness (e.g. manufactured to within 0.1–0.5 microns), and the diaphragm etch depth 35 should be accurate (e.g. manufactured to within 0.1–0.5 microns) so that the etalon cavity length is accurate (e.g. within 1 micron) in the final device. An accurately manufactured etalon cavity length 40 is important for proper functioning of the present pressure sensor.

Generally, the etalon cavity length 40 should be manufactured to within 1 micron of the target value. For pressure sensor designs where the etalon cavity length 40 is short (e.g. less than 20 microns), the etalon cavity length 40 should be more accurate; for pressure sensor designs where the etalon cavity length 40 is long (e.g. greater than 100 microns), the etalon cavity length 40 can be less accurate. In a particular design developed by the inventors, the nominal etalon cavity length 40 is 82 microns, and the etalon cavity length 40 accuracy is about ±1 micron. Generally, the etalon cavity length 40 should be within ±2% of a nominal etalon cavity length 40. For precision pressure sensors, the etalon cavity length 40 may need to be more accurate (e.g. within 0.5% of the nominal etalon cavity length 40).

In a particular embodiment of the invention, the silicon base layer 20, etch stop layer 24, and fiber stop layer 28 are made from a silicon-on-insulator (SOI) wafer. The SOI wafer has a device layer and a handle layer separated by an etch stop layer 24. In this embodiment, the fiber stop layer 28 is fabricated from the device layer; and the base layer 20 is fabricated from the handle layer. The device layer of an SOI wafer has an accurate thickness, which provides the fiber stop layer 28 with an accurate thickness. Also, the etch stop layer 24 can be relatively thin (e.g. less than 0.2 microns).

Optionally, the diaphragm cap layer 32 is bonded (e.g. bonded by direct thermo-compression bonding or field-assisted bonding) to the fiber stop layer 28. A thin film of borosilicate glass or other materials (not shown) can be disposed between the fiber stop layer 28 and diaphragm cap layer 32 to facilitate bonding. Preferably, the diaphragm cap 32 is made from an anisotropically etched silicon wafer. The etch depth 35 is determined by the duration of the anisotropic etch and so can be very accurate.

Figure 2:
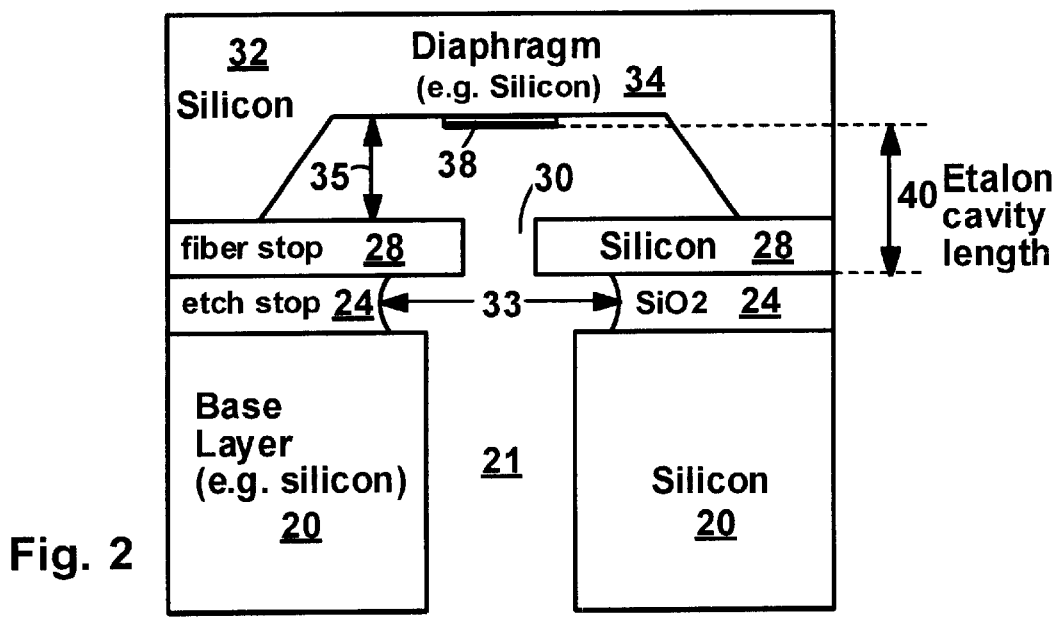
FIG. 2 shows the embodiment of FIG. 1 without the optical fiber.

FIG. 2 shows a side view of the present invention without the optical fiber 22. The etch stop layer 24 has a hole 33 larger than the optical fiber hole 21 so the fiber 22 contacts the fiber stop layer 28.

FIGS. 3a–d, 4a–b, and 5a–d illustrate a method for making the present invention. FIGS. 3a–3d illustrate how to make the base layer 20, etch stop layer 24 and fiber stop layer 28; FIGS. 4a–b illustrate how to make the diaphragm cap layer 32, and FIGS. 5a–5b illustrate bonding, application of the reflective coatings 36 and 38, and optical fiber 22 insertion.

FIG. 3a: An SOI wafer having the base layer 20, the etch stop layer, 24, and the fiber stop layer 28 is provided. The base layer 20 is made from the handle layer of the SOI wafer, and the fiber stop layer 28 is made from the device layer of the SOI wafer.

FIG. 3b: Deep reactive ion etching (RIE) is used to form the optical fiber hole 21 in the base layer 20. The hole 21 is sized to fit an optical fiber (not shown). Optionally, the hole 21 is circular, but the hole 21 can have any other shape that holds an optical fiber (e.g. square or triangular holes are possible). Optionally, the hole 21 has smooth and vertical sidewalls. The hole 21 may have a slightly funneled shape to ease fiber insertion (i.e. the hole 21 may be smaller adjacent to the etch stop layer).

FIG. 3c: Deep RIE or isotropic wet etching is used to form the fiber stop hole 30. The fiber stop hole 30 is necessarily smaller than the optical fiber 22 (not shown) and optical fiber hole 21. The fiber stop hole 30 is smaller than the optical fiber (not shown) so that the fiber stop layer 28 functions as a fiber stop. The hole 30 is large enough to allow light from the optical fiber (not shown) to pass through the hole 30. The fiber stop hole 30 can be round, square or any other shape that allows light to pass.

FIG. 3d: The etch stop layer 24 is removed in the vicinity of the holes 30, 21 so that an inserted fiber (not shown) will contact the fiber stop layer 28. The etch stop layer 24 should be partially removed using a technique that does not damage the base layer or fiber stop layer 28. For example, if the etch stop layer 24 is made of SiO2, and the base layer 20 and fiber stop layer 28 are made of silicon, the etch stop layer 24 can be removed using dilute HF without damaging the fiber stop layer 28 or handle layer.

FIG. 4a: A solid silicon wafer 56 having a relatively accurate thickness (e.g. ±5 microns total thickness variation (TTV)) is provided. The wafer 56 has a patterned mask 58 (e.g. comprising SiO2, borosilicate glass, silicon nitride, or metals). The silicon wafer 56 will be used to form the diaphragm cap layer 32.

FIG. 4b: The wafer 56 is exposed to anisotropic etchant (e.g. KOH) so that an etched pit 60 having an accurate depth is formed. The depth of the pit 60 is equivalent to the etch depth 35 in FIGS. 1 and 2. After etching, the mask 58 may be removed. If the mask 58 is not removed, the mask material should have thermal expansion characteristics that closely match the other layers of the device, or should be thin enough so that thermal expansion mismatches do not cause significant mechanical stress. Borosilicate glass, for example, has a coefficient of thermal expansion (CTE) that is similar to the CTE of silicon.

FIGS. 5a–5b: The chip produced in FIGS. 3a–3d, and the chip produced in FIGS. 4a–4b are bonded together to produce the present pressure sensor having the base layer 20, etch stop layer 24, fiber stop layer 28, diaphragm cap layer 32 and diaphragm 34. The chips are bonded so that the pit 60 faces the fiber stop layer 28. The diaphragm cap layer 32 and fiber stop layer 28 can be bonded by direct bonding or electrostatic bonding. Preferably, bonding of the chips is performed on the wafer scale. A thin film of borosilicate glass may be provided on the diaphragm cap layer 32 of fiber stop 28 to facilitate bonding.

FIG. 5c: The reflective coating 38 is deposited through the fiber hole 21 and onto the diaphragm 34. Alternatively, the coating 38 is applied before the diaphragm cap 32 and fiber stop layer 28 are bonded. However, in this case, the reflective coating 38 must be able to tolerate the elevated temperatures required for bonding. Alternatively, if low-temperature bonding methods are used (epoxy adhesives), then a wider variety of reflective coatings (i.e., coatings damaged by high heat) can be applied to the diaphragm 34 before bonding.

After the diaphragm cap layer 32 and fiber stop layer 28 are bonded, and after the reflective coating 38 is applied, the wafer is diced into individual pressure sensors. Each pressure sensor can have a footprint size of about 1 mm×1 mm or less. After dicing, the pressure sensor may be coated with a protective coating (e.g. thermally grown oxide, CVD nitride, or CVD oxide).

FIG. 5d: The optical fiber 22 is inserted into the fiber hole 21 of individually diced pressure sensors. The optical fiber 22 is pushed against the fiber stop layer 28 so that the distance between the fiber end 25 and the diaphragm 34 is fixed. The fiber 22 is then rigidly bonded to the pressure sensor. The optical fiber 22 should not be able to 'piston' within the fiber hole 21, which would cause undesired changes in the etalon cavity length 40. The optical fiber 22 can be adhered to the pressure sensor by sol-gel glasses, glass solders, low-melting point glasses, metal solder, or polymer adhesives having high glass transition temperatures (not shown). In the case of using metal solder, the optical fiber 22 and optical fiber hole 21 should be metalized before assembly.

It is noted that many different bonding techniques can be used to bond the diaphragm cap layer 32 and the fiber stop layer 28. For example, aluminum thermo-compression bonding (described in U.S. Pat. No. 3,722,074 to Klomp and U.S. Pat. No. 5,178,319 to Coucoulas and incorporated herein by reference as if set forth in full) can be used. In this case, an aluminum layer (not shown) is preferably thin compared to the diaphragm cap layer thickness and base layer thickness. For example, the aluminum layer (not shown) can be about 0.2–2 microns thick.

Also, the bond between the diaphragm cap layer 32 and fiber stop layer 28 can be provided by a thin layer of glass or silica. In this case, the glass preferably has a thermal expansion that closely matches the thermal expansion of the silicon. For example, a thin film (e.g. 0.1–1 micron thick) of sputtered borosilicate glass can be used.

Figure 6:
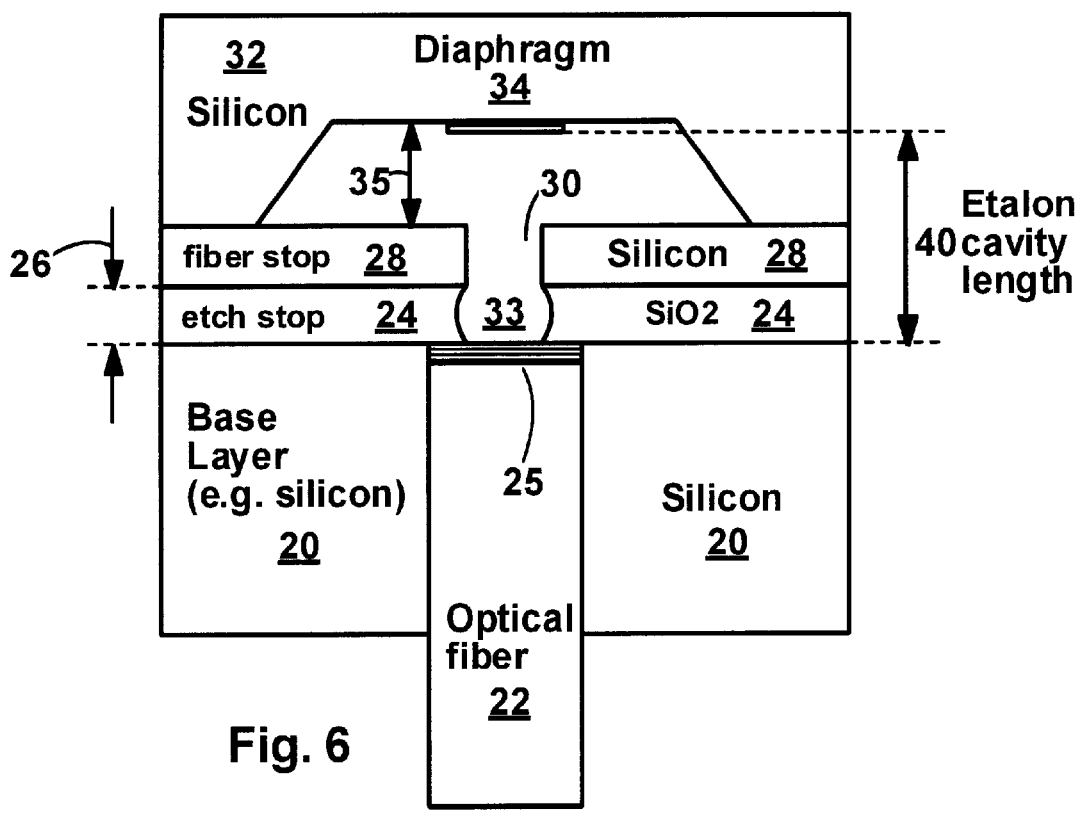
FIG. 6 shows an alternative embodiment where the optical fiber is butted against the etch stop layer for another embodiment.

FIG. 6 shows an alternative embodiment of the present invention wherein the etch stop layer hole 33 is smaller than the optical fiber endface 25. The optical fiber 22 is butted against the etch stop layer 24. Consequently, the etalon cavity length 40 is defined by the combined thickness of the fiber stop layer 28, the etch stop layer 24, and the etch depth 35. The embodiment of FIG. 6 can be made by etching the etch stop layer 24 from the fiber stop layer 28 side.

Figure 7:
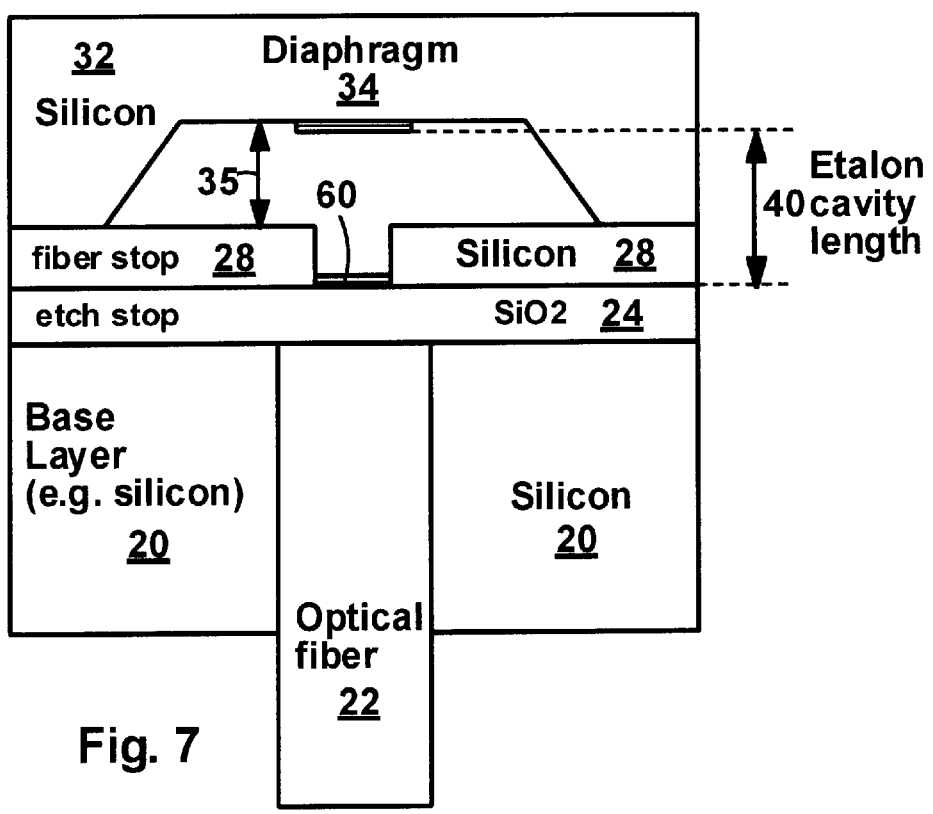
FIG. 7 shows an alternative embodiment where the etch stop layer does not have a hole. The etch stop layer covers the optical fiber hole.

FIG. 7 shows an embodiment wherein the etch stop layer 24 does not have a hole 33. The etch stop layer 24 covers the optical fiber hole 21. Light from the optical fiber 22 passes through the etch stop layer 24. Therefore, the etch stop layer must be made of a transparent material such as silicon oxide, silicon oxynitride, or silicon nitride, for example. Preferably in this embodiment, the etch stop layer is index-matched to the optical fiber core (not shown). A reflective coating 60 can be provided on the etch stop layer 24 so that the etalon cavity length 40 is defined by the combined thickness of the fiber stop layer 28 and the etch depth 35.

Figure 8:
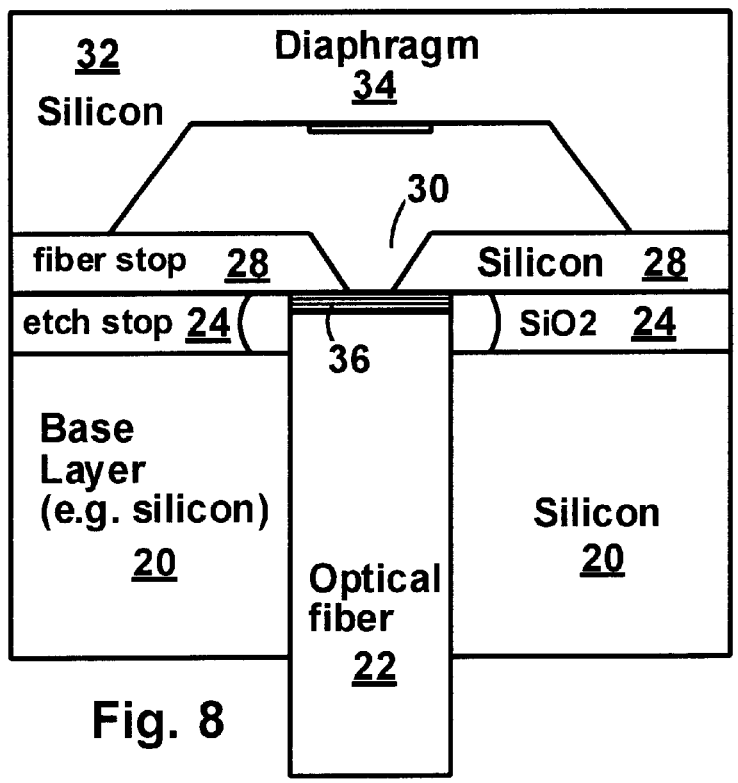
FIG. 8 shows an alternative embodiment where the fiber stop hole is made by anisotropic etching.

FIG. 8 shows an embodiment wherein the fiber stop hole 30 is made by anisotropic etching of the fiber stop layer 28.

Figure 9:
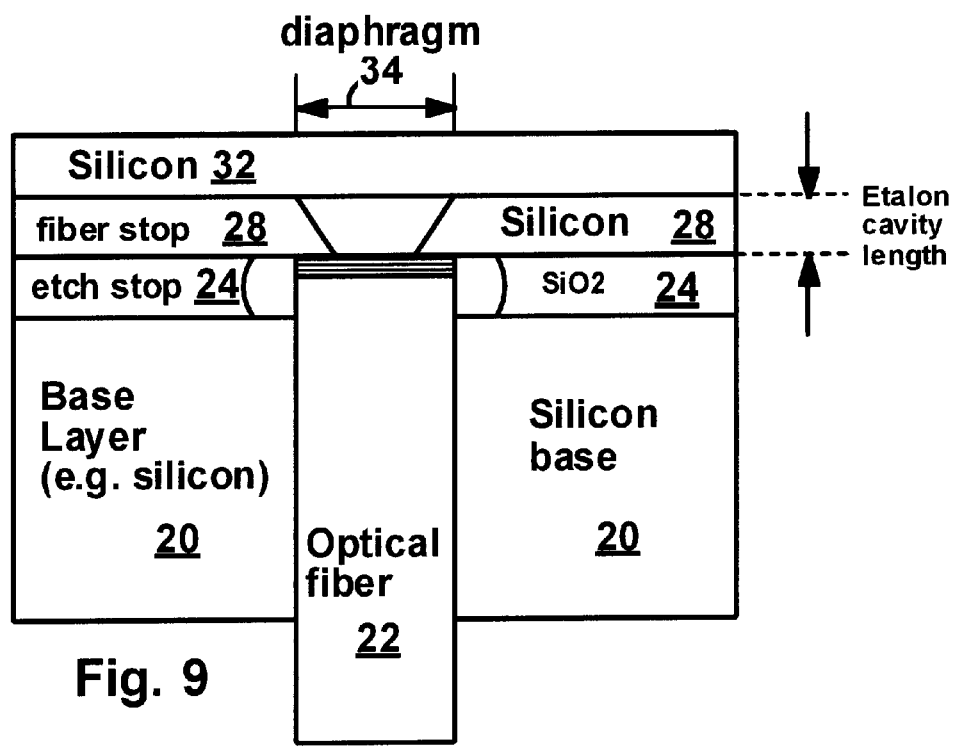
FIG. 9 shows an embodiment where the diaphragm cap layer 32 is bonded directly to the fiber stop layer.

FIG. 9 shows an embodiment wherein the diaphragm cap layer 32 is a flat layer (without an etched pit) bonded to the fiber stop layer 28, the diaphragm 34, being the unbonded area of the diaphragm cap layer 32. The etalon cavity length 40 is solely determined by the thickness of the fiber stop layer 28. Hence, the etalon cavity length 40 can have exceptional accuracy. Alternatively (not shown), the etch stop layer 24 does not have a fiber hole 33, and the etalon cavity length 40 is determined by the combined thickness of the etch stop layer 24 and fiber stop layer 28.

The embodiment of FIG. 9 can be made by bonding a thin silicon wafer to the fiber stop layer 28 using any of the bonding techniques previously discussed herein.

Figure 10:
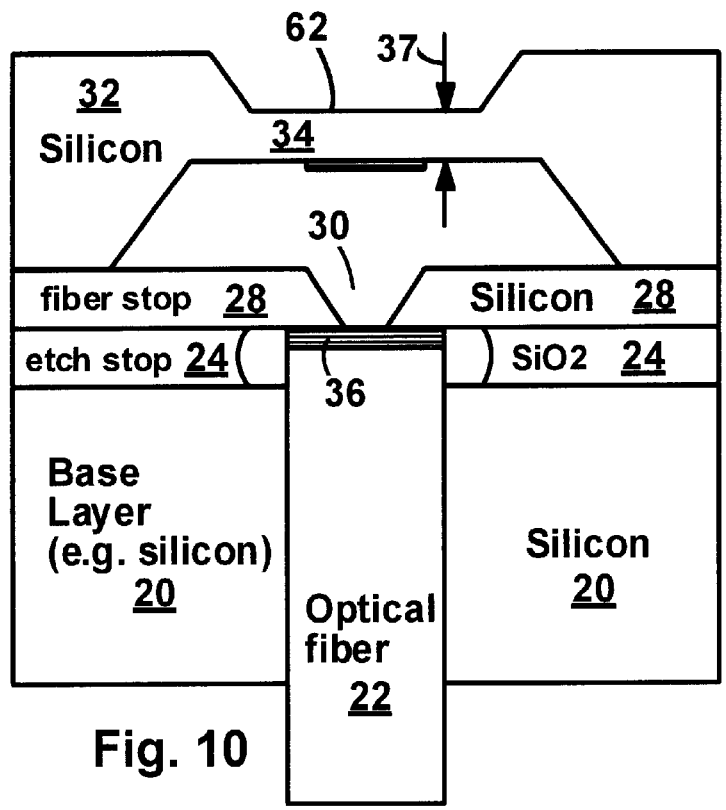
FIG. 10 shows an embodiment where the diaphragm cap layer has a recessed area on the outer surface.

FIG. 10 shows an alternative embodiment where the top of the diaphragm cap layer 32 has a recessed area 62. optionally, the recessed area 62 is made by anisotropic etching. Forming the recessed area 62 provides an additional method to control the thickness 37 of the diaphragm 34, and, hence, the sensitivity of the present pressure sensor.

Figures 11A, 11B, 11C:
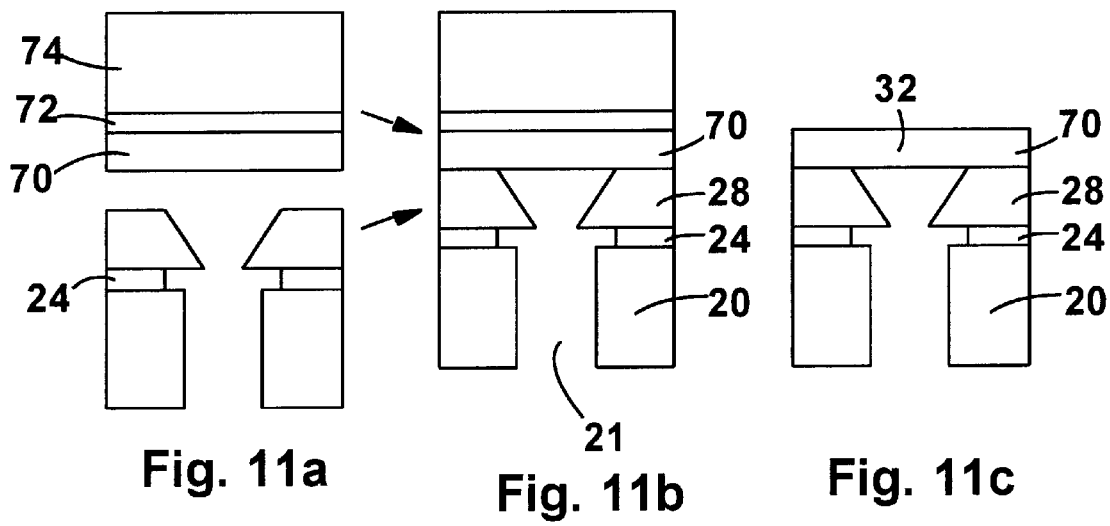
FIGS. 11a–11c illustrate an alternative method for making the sensor of FIG. 9.

FIGS. 11a–11c illustrate an alternative method for making the device of FIG. 9. In FIG. 11a, an SOI chip having a device layer 70, an etch stop layer 72, and a handle layer 74 is provided. In FIG. 11b, the device layer 70 is bonded to the fiber stop layer 28. In FIG. 11c, the handle layer 74 and etch stop layer 72 are removed by etching away the etch stop layer 72 (i.e. the etch stop layer 72 functions as a release layer) The diaphragm cap layer 32 has an accurate thickness because it is formed from the device layer 70. Optionally, only the handle layer 74 is removed so that the etch stop layer 72 remains in the final device.

Figure 12:
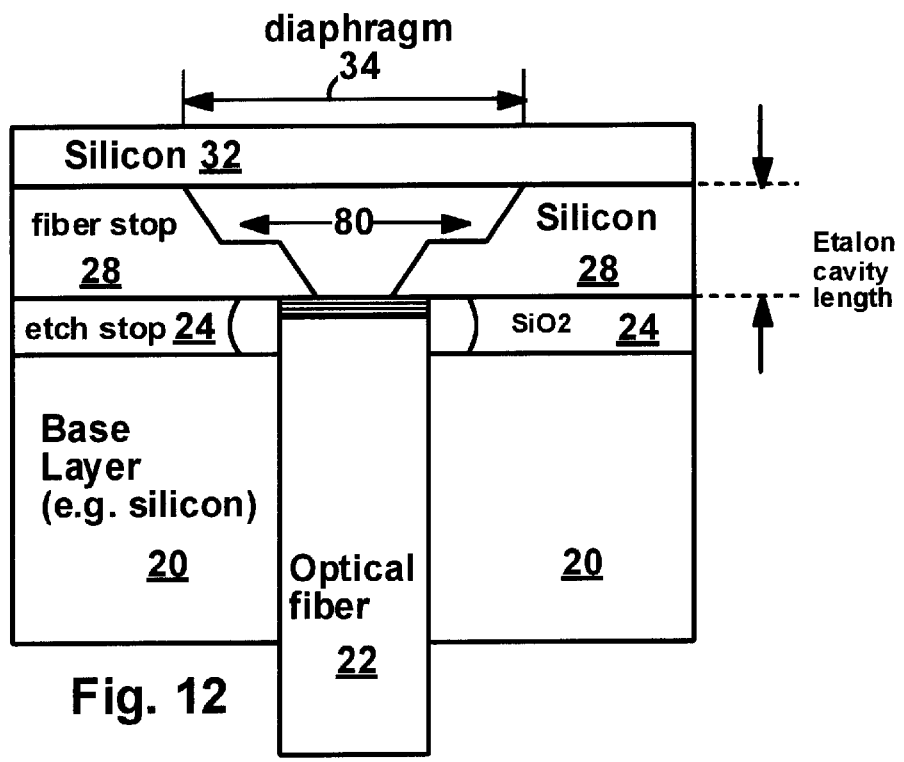
FIG. 12 shows an embodiment having a two-level fiber stop hole.

FIG. 12 shows yet another embodiment where the fiber stop hole 80 has a two-level structure. Preferably, the fiber stop hole 80 is made by anisotropic etching. The 2-level structure can be made by dry etching or anisotropic wet etching. The two-level structure allows the width of the diaphragm 34 to be independent of the fiber stop layer 28 thickness.

Figure 13:
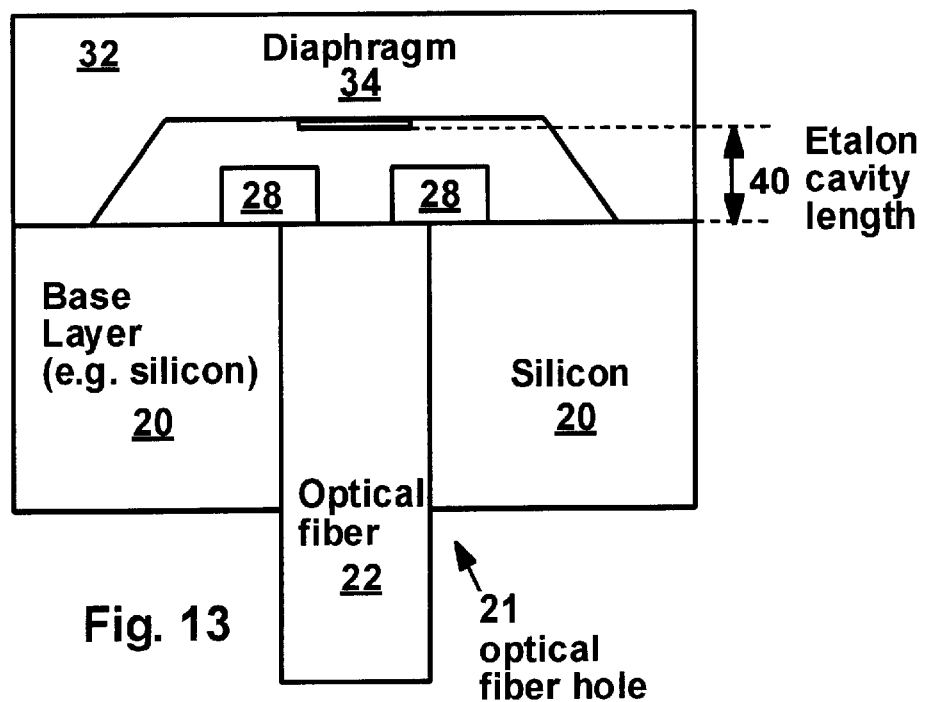
FIG. 13 shows an embodiment where the diaphragm cap layer is bonded to the base layer. The fiber stop layer is enclosed within the pressure sensor.

FIG. 13 shows yet another embodiment of the present invention where the fiber stop layer 28 does not extend between the base layer 20 and the diaphragm 34. The fiber stop layer 28 is located only in the area near the optical fiber 22. Since the fiber stop layer 28 does not extend between the base layer 20 and diaphragm cap layer 32, mechanical stress caused by thermal expansion will tend to be isolated near the fiber hole 21. The diaphragm 34 will be relatively isolated from the thermal expansion induced stress. Therefore, the fiber stop layer 28 can be made of materials that have a substantial thermal expansion mismatch with respect to the diaphragm cap layer 32 and base layer 20, without causing undesired nonlinear behavior in the pressure sensor. For example, the fiber stop layer 28 can be made of SiO2, alumina, silicon nitride, carbides or metals while the base layer 20 and diaphragm cap layer 32 are made of silicon.

In the device of FIG. 13, the fiber stop layer 28 can have a thickness in the range of about 1–100 microns or preferably 5–40 microns. Bonding between the diaphragm cap 32 and base layer 20 can be facilitated by a thin film of glass such as borosilicate glass (not shown).

Figure 14A:
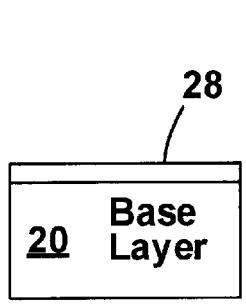
FIGS. 14a–d illustrate a method for making the sensor of FIG. 13 for one embodiment.

FIGS. 14a–14d illustrate a method for making the device of FIG. 13:

FIG. 14a: The starting material is a chip with a base layer 20 and a fiber stop layer 28. The base layer 20 can be made of silicon and the fiber stop layer 28 can be made of SiO2, glass, ceramics, metals, or other materials.

Figure 14B:
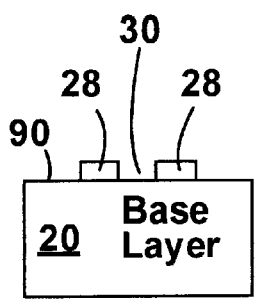

FIG. 14b: the fiber stop layer 28 is etched to provide a fiber stop hole 30 and to expose regions 90 of the base layer 20 for bonding to the diaphragm cap layer 32.

Figure 14C:
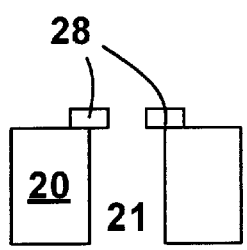
Figure 15A:
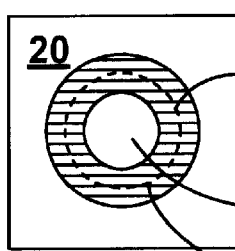
FIGS. 15a–b are top views of the base layer illustrating possible shapes for the fiber stop layer for one embodiment.
Figure 15B:
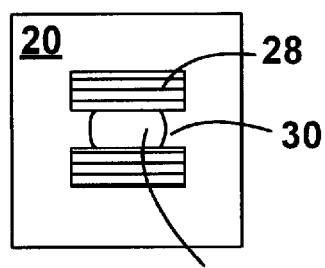

FIG. 14c: The optical fiber hole 21 is formed in the base layer 20. FIG. 15a shows a top view of an embodiment where the fiber stop layer 28 is etched to have a 'doughnut' shape that provides a fiber stop. FIG. 15b shows an alternative embodiment where the fiber stop layer 28 comprises two strips that function as a fiber stop. The area between the strips is the fiber stop hole 30.

Figure 14D:
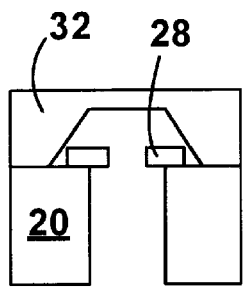

FIG. 14d: The diaphragm cap layer 32 is bonded to the base layer 20. The diaphragm cap 32 is bonded to the base layer 20 in areas 90 where the base layer 20 is exposed. In this way, the fiber stop layer 28 is enclosed within the device.

Figure 16:
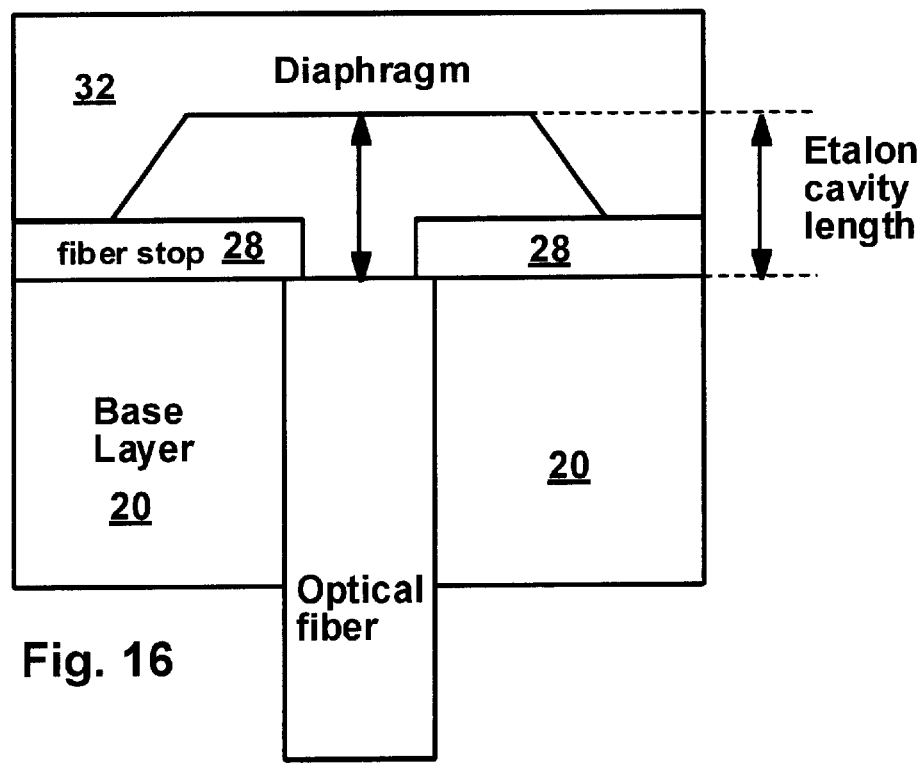
FIG. 16 shows an embodiment where the fiber stop layer is disposed between the base layer and diaphragm cap layer. The device does not have an etch stop layer.

FIG. 16 shows yet another embodiment of the present invention in which the fiber stop layer 28 is disposed between the base layer 20 and the diaphragm cap layer 32. The device does not have an etch stop layer. The fiber stop layer 28 is made of a material different than the base layer 20 and diaphragm cap layer 32. For example, the fiber stop layer 28 can be made of SiO2, silicon nitride, alumina, ceramics or metals. The fiber stop layer 28 preferably has a thermal expansion coefficient that approximately matches (e.g. within $3 \times 10^{-6}$/C.) the thermal expansion coefficient of the base layer 20 and diaphragm cap layer 32. The more closely the thermal expansion coefficients match, the thicker the fiber stop layer 28 can be. The fiber stop layer 28 is disposed between the base layer 20 and the diaphragm cap layer 32.

Figure 17:
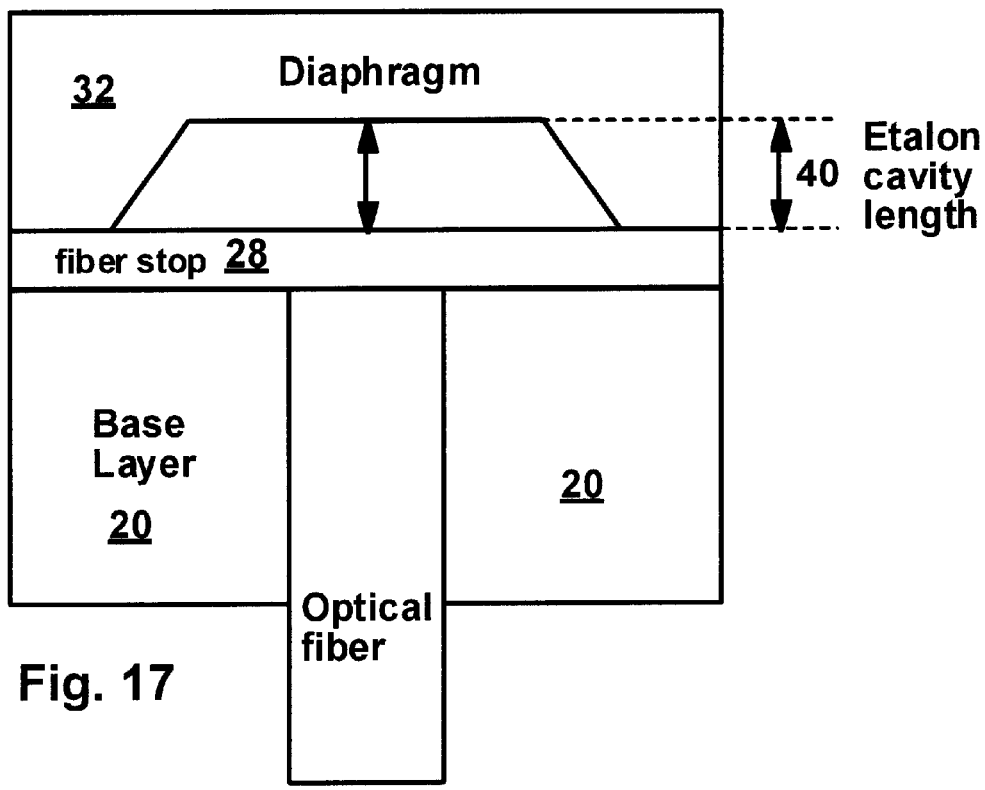
FIG. 17 shows yet another embodiment where the fiber stop layer comprises transparent layer without a hole. The fiber stop layer covers the optical fiber hole.

FIG. 17 shows yet another embodiment of the present invention where the fiber stop layer 28 is transparent and covers the fiber stop hole 30. In this embodiment, the fiber stop layer 28 can be made of glass, silicon nitride or SiO2, for example.

Figure 18:
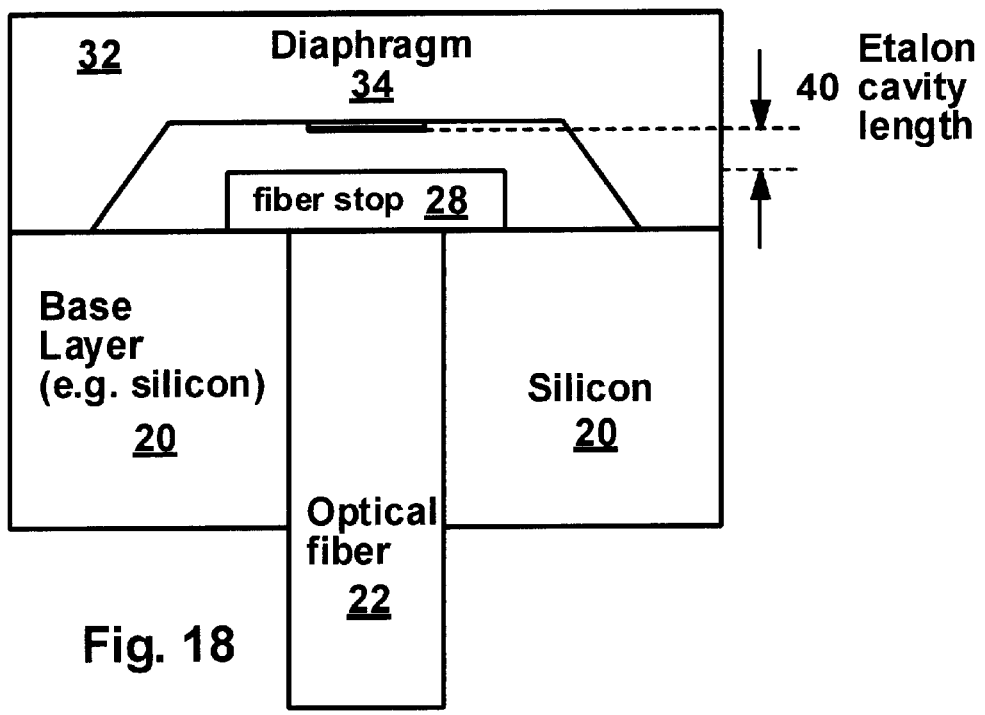
FIG. 18 shows yet another embodiment where the fiber stop covers the optical fiber hole, but does not extend between the base layer and the diaphragm cap layer.

FIG. 18 shows yet another embodiment where the fiber stop layer 28 is transparent, covers the fiber stop hole 30, and is not disposed between the diaphragm cap layer 32 and base layer 20.

In one embodiment of the present invention, the enclosed volume between the diaphragm cap layer 32 and fiber stop layer 28 is filled with an inert gas such as helium. Filling the enclosed volume with air is undesirable in many applications because constituents (e.g. oxygen) of the air can chemically react with and damage internal surfaces such as the reflective coatings.

Optionally, the enclosed volume between the diaphragm cap layer 32 and the fiber stop layer 28 are hermetically enclosed so that the reflective coatings 36 and 38 on the diaphragm 34 and optical fiber 22 (or etch stop layer 24) are protected.

The etch stop layer 24 will likely have a different coefficient of thermal expansion than the rest of the pressure sensor. Therefore, if the etch stop layer 24 is relatively thick (e.g. greater than 2–5 microns thick), then the etch stop layer 24 can cause disruptive mechanical stress in the device as the device changes temperature. Such mechanical stress will cause nonlinear distortions in pressure measurement. In order to minimize such distortions, the etch stop layer 24 should be thin if it has a large thermal expansion mismatch compared to the rest of the device. The more closely the thermal expansion coefficients match, the thicker the etch stop layer 24 can be without causing measurement distortion. For example, the etch stop layer 24 is preferably less than 1/100, 1/250 or 1/500 the thickness of the silicon base layer 20 and less than 1/25 or 1/50 the thickness of the fiber stop layer 28.

Also, a vent can be provided between the enclosed air space and the outside world. A vent can be provided by making the optical fiber hole 21 a keyhole shape that does not hermetically seal an optical fiber.

The etch stop layer 24 can be made of many different materials that can resist etchants used to etch the base layer 20 and fiber stop layer 28. For example, the etch stop layer 24 can be SiO2, silicon nitride, or silicon carbide if the base layer and fiber stop layer 28 are made of silicon. It is preferable for the etch stop layer 24 to have a thermal expansion coefficient that is similar to (e.g. equal to within $3\times10^{-6}$/degree Celsius) the thermal expansion coefficient of the base layer 20, fiber stop layer 28, and diaphragm cap layer 32.

The base layer 20, fiber stop layer 28, and diaphragm cap layer 32 can be made of materials other than silicon. For example, the base layer 20, fiber stop layer 28, and diaphragm cap layer 32 can be made of ceramics (silicon nitride, alumina), glasses (silica, borosilicate), quartz, and metals. Preferably, the base layer 20, fiber stop layer 28, and diaphragm cap layer 32 are made of the same material so that thermal expansion mismatches are avoided.

For example, in an alternate embodiment of the invention, the base layer 20, fiber stop layer 28 and diaphragm cap layer 32 are made of quartz or borosilicate glass, and the etch stop layer 24 is made of alumina.

It is noted that, although borosilicate glass is described as a suitable material for facilitating bonding or for the etch stop layer 24, many other materials can also be used. The materials used should have a thermal expansion coefficient that is closely matched to the materials of the base layer 20 and diaphragm cap layer 32 (e.g. silicon). Glasses and materials other than borosilicate glass can be used if they are sufficiently well matched in thermal expansion to the materials used for the base layer and diaphragm cap layer 32.

It is also noted that additional layers can be included in the present device. For example, the present invention may include layers between the base layer 20 and fiber stop layer 28, or between the fiber stop layer 28 and diaphragm cap layer 32. Such additional layers can provide functions such as facilitating bonding, modifying thermal expansion or thermal conductivity characteristics, providing electrical conductivity, or providing external solder-wettable surfaces, for example. The use of such additional layers is within the scope of the present invention.

It is also noted that the present pressure sensor may be provided without the optical fiber 22. The optical fiber 22 can be inserted by the user.

It will be clear to one skilled in the art that the above embodiments may be altered in many ways without departing from the scope of the invention. Accordingly, the scope of the invention should be determined by the following claims and their legal equivalents.

What is claimed is:

1. An apparatus for measuring pressure, comprising:
    a) a base layer having an optical fiber hole for receiving an optical fiber;
    b) a fiber stop layer disposed at least partially over the optical fiber hole, wherein the fiber stop layer does not extend between a diaphragm cap layer and base layer, and wherein the fiber stop layer is made of a material different from the base layer;
    c) the diaphragm cap layer bonded over the base layer, wherein:
        1) the diaphragm cap layer comprises a diaphragm so that an etalon cavity length is defined,
        2) the diaphragm is aligned with the optical fiber hole;
    whereby the etalon cavity length is altered by external pressure applied to the diaphragm.

2. The apparatus of claim 1 wherein the fiber stop layer covers the optical fiber hole, and the fiber stop layer is made of transparent material.

3. The apparatus of claim 1 wherein the fiber stop layer has a fiber stop hole smaller than the optical fiber hole and aligned with the optical fiber hole.

4. The apparatus of claim 1 further comprising an optical fiber disposed in the fiber hole and butted against the fiber stop layer.

5. The apparatus of claim 1 wherein the etalon cavity length is in the range of 20–200 microns.

6. The apparatus of claim 1 wherein the base layer has a thickness in the range of 125–1000 microns.

7. The apparatus of claim 1 wherein the fiber stop layer has a thickness in the range of 5–40 microns.

8. The apparatus of claim 1 wherein the base layer and diaphragm cap layer are made of the same material.

9. The apparatus of claim 1 wherein the base layer, fiber stop layer and diaphragm cap layer are made of materials selected from the group consisting of single crystal silicon, SiO2, silicon nitride, aluminum nitride and alumina.

10. The apparatus of claim 1 wherein a top of the diaphragm cap layer has a recessed area.

11. The apparatus of claim 1 wherein the fiber stop layer has a coefficient of thermal expansion (CTE) equal to the CTE of the base layer to within $3\times10^{-6}$/degree Celsius.

12. The apparatus of claim 1 wherein the base layer and the diaphragm cap layer are made of single crystal silicon.

13. An apparatus for measuring pressure, comprising:
    a) a base layer having an optical fiber hole for receiving an optical fiber;
    b) a fiber stop layer disposed at least partially over the optical fiber hole;
    c) an etch stop layer disposed between the base layer and the fiber stop layer, wherein the etch stop layer is made of a different material than the base layer and fiber stop layer;
    d) a diaphragm cap layer disposed over the fiber stop layer, wherein:
        1) the diaphragm cap layer comprises a diaphragm so that an etalon cavity length is defined,
        2) the diaphragm is aligned with the optical fiber hole;
    whereby the etalon cavity length is altered by external pressure applied to the diaphragm.

14. The apparatus of claim 13 wherein the fiber stop layer and etch stop layer extend between the diaphragm cap layer and the base layer.

15. The apparatus of claim 13 wherein the diaphragm cap layer is a flat layer stacked on the fiber stop layer.

16. The apparatus of claim 15 wherein the fiber stop hole has a two-level structure.

17. The apparatus of claim 13 wherein the etch stop layer has an etch stop hole aligned with the optical fiber hole.

18. The apparatus of claim 17 wherein the etch stop hole is larger than the optical fiber hole.

19. The apparatus of claim 17 wherein the etch stop hole is smaller than the optical fiber hole.

20. The apparatus of claim 13 wherein the etch stop layer covers the optical fiber hole and the etch sop layer is made of transparent material.

21. The apparatus of claim 13 further comprising an optical fiber disposed in the fiber hole and the optical fiber is butted against the fiber stop layer or the etch stop layer.

22. The apparatus of claim 13 wherein the etch stop layer has a thickness in the range of 0.04 to 2 microns.

23. The apparatus of claim 13 wherein the etch stop layer has a thickness less than 1/250 the thickness of the base layer.

24. The apparatus of claim 13 wherein the etch stop layer has a thickness less than 1/50 the thickness of the fiber stop layer.

25. The apparatus of claim 13 wherein the etch stop layer is made of a material selected from the group consisting of SiO2, glass, silicon nitride, alumina, carbides, and metals.

26. The apparatus of claim 13 wherein the base layer, fiber stop layer, and diaphragm cap layer are made of the same material.

27. The apparatus of claim 13 wherein the etch stop layer has a coefficient of thermal expansion (CTE) equal to the CTE of the base layer and fiber stop layer to within $3\times10^{-6}$/degree Celsius.

28. The apparatus of claim 13 wherein the etalon cavity length is in the range of 20–200 microns.

29. The apparatus of claim 13 wherein the base layer has a thickness in the range of 125–1000 microns.

30. The apparatus of claim 13 wherein the fiber stop layer has a thickness in the range of 5–40 microns.

31. The apparatus of claim 13 wherein the fiber stop layer has fiber stop hole smaller then the optical fiber hole and positioned over the optical fiber hole.

32. The apparatus of claim 13 wherein the base layer, diaphragm cap layer and fiber stop layer are made of single crystal silicon.

33. An apparatus for measuring pressure, comprising:
a) a base layer having an optical fiber hole for receiving an optical fiber;
b) a fiber stop layer disposed over the optical fiber hole;
c) a diaphragm cap layer disposed over the fiber stop layer, wherein:
1) the diaphragm cap layer comprises a diaphragm so that an etalon cavity length is defined,
2) the diaphragm is aligned with the optical fiber hole; whereby the etalon cavity length is altered by external pressure applied to the diaphragm.

34. The apparatus of claim 33 wherein the fiber stop layer covers the optical fiber hole, and the fiber stop layer is made of transparent material.

35. The apparatus of claim 33 wherein the fiber stop layer has a fiber stop hole smaller than the optical fiber hole and aligned with the optical fiber hole.

36. The apparatus of claim 33 wherein the base layer and diaphragm cap layer are made of the same material.

37. The apparatus of claim 33 wherein a top of the diaphragm cap layer has a recessed area.

38. The apparatus of claim 33 further comprising an etch stop layer disposed between the fiber stop layer and the base layer.

39. The apparatus of claim 38 wherein the etch stop layer has an etch stop hole aligned with the optical fiber hole.

40. The apparatus of claim 38 wherein the etch stop hole is larger than the optical fiber hole.

41. The apparatus of claim 38 wherein the etch stop hole is smaller than the optical fiber hole.

42. The apparatus of claim 38 wherein the etch stop layer covers the optical fiber hole and the etch sop layer is made of transparent material.

43. The apparatus of claim 33 wherein the fiber stop layer extends between the diaphragm cap layer and the base layer.

44. The apparatus of claim 33 wherein the diaphragm cap layer is a flat layer stacked on the fiber stop layer.

45. The apparatus of claim 33 wherein the fiber stop hole has a two-level structure.

46. The apparatus of claim 33 wherein the base layer, fiber stop layer, and diaphragm cap layer are made of the same material.

47. The apparatus of claim 33 wherein the etch stop layer has a coefficient of thermal expansion (CTE) equal to the CTE of the base layer and fiber stop layer to within $3\times10^{-6}$/degree Celsius.

48. The apparatus of claim 33 wherein the fiber stop layer has a fiber stop hole smaller then the optical fiber hole and positioned over the optical fiber hole.

49. The apparatus of claim 33 wherein the fiber stop layer has a coefficient of thermal expansion (CTE) equal to the CTE of the base layer to within $3\times10^{-6}$/degree Celsius.

* * * * *